No Printed Specification Available
7528X
J. Ives.
Clock Pinion Wheels.
Patented Apr. 12, 1833.
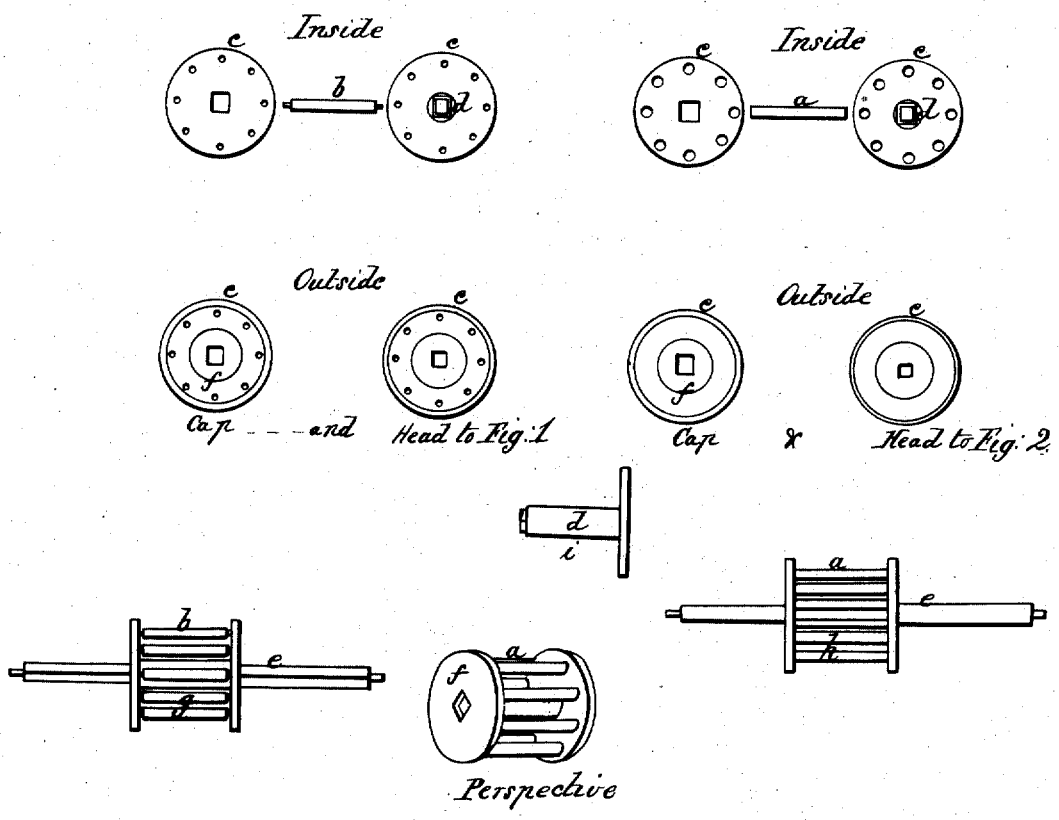

75287 April 12 1833

Joseph Ives of Bristol Connecticut
Letters Patent

The Schedule referred to in these Letters Patent and forming part of the same containing a description in the words of the said Joseph Ives himself of his improvement in the striking part of Clocks To all whom these presents shall come. Joseph Ives of Bristol in the County of Hartford and State of Connecticut, Gentleman, sends Greeting. Be it Known that I the said Joseph Ives. have invented constructed made and applied to use a new and useful improvement in the structure of the striking part of common House Clocks. specified in the words following to wit. This improvement consists in what I term a double count wheel. in the striking part of the clock and in the application of the double count wheel to clocks constructed and made with rolling pinions. The count wheel heretofore, and now used in the construction of the striking part of clocks. which I here call the single count wheel, revolves twice in repeating regularly. the twenty four hours of the day). that is in regulating one hundred and fifty six strokes. of the clock. but the double count wheel which I have invented revolves but once in performing the same operation. My double count wheel is made as will be seen by the accompanying model by so arranging the various stops for of the striking of the hours that the different stops for twelve hours occupy but one half the circle or circumference of the wheel, whereas in the single count wheel ~~now in~~ use the same stops occupy the whole circle or circumference. in the use of the double count wheel the striking of the clock is regulated and the different stops are made in the same manner as in the use of the single count wheel. but in half a revolution of my double count wheel it has all the stops and regulates the same strokes as the single count wheel does in a whole revolution. To make my double count wheel I take or make a wheel of suitable dimen

75288X ings and proportions for the clock it is to be used in and divide and mark out, and make the Stops for twelve hours, or half a day, the same as on a single count wheel except that they extend over but one half the circle or circumference of the wheel, and from the place where the wheel regulates the striking of twelve strokes for the hour of twelve, begin again mark out and make the Stops in the other half of the circle or circumference of the wheel as on the first half of the same so that the strokes of the clock for the twenty four hours of the day are the same as where the single count wheel is used, but the double count wheel revolves but once whereas the single count wheel revolves twice in performing that operation. I consider the best position in the clock for the double count wheel to be by the side of the first or barrel wheel, in the striking part of the clock, and attached to the same by division pins extending from one wheel to the other, and of such length as to fix the count wheel at sufficient distance from the other wheel to give room for the drop wire to perform its operations.

What I claim as my Invention and is the double count wheel as distinguished from the single count wheel, and the application of the double count wheel to clocks constructed with rolling pinions. The benefits of this improvement are that the clocks can be made with less expense, will run with much less weight, and are not as liable to get out of repair

In testimony whereof that the above is a true specification of my said improvement as above described I have hereunto set my hand and seal the 12th day of March in the year of our Lord 1833.

Witnesses
Henry L Harrington
Calvin Butler.

Joseph Ives.

(Patented 13 April 1833)

(Drawing made)

[illegible]